(12) United States Patent
Marino et al.

(10) Patent No.: US 10,092,010 B1
(45) Date of Patent: Oct. 9, 2018

(54) WATER-TIGHT SPRINGFORM BAKING PAN

(71) Applicant: Premier Pan Company, Inc., Crescent, PA (US)

(72) Inventors: Curt Marino, Crescent, PA (US); Jason A. Zaperach, New Brighton, PA (US)

(73) Assignee: PREMIER PAN COMPANY, INC., Crescent, PA (US)

( * ) Notice: Subject to any disclaimer, the term of this patent is extended or adjusted under 35 U.S.C. 154(b) by 0 days.

(21) Appl. No.: 15/462,535

(22) Filed: Mar. 17, 2017

(51) Int. Cl.
*A21B 3/13* (2006.01)
*A47J 37/01* (2006.01)
*A47J 43/20* (2006.01)
*B65D 25/28* (2006.01)

(52) U.S. Cl.
CPC .............. *A21B 3/137* (2013.01); *A47J 37/01* (2013.01); *A47J 43/20* (2013.01); *B65D 25/2802* (2013.01)

(58) Field of Classification Search
CPC .. A21B 3/137; A21B 3/13; A21B 5/08; A21B 5/02; A21B 5/00; A47J 37/01; A47J 37/00; A47J 43/20; B65D 25/28; B65D 25/2802; B65D 7/12; B65D 7/00; B65D 7/24; B65D 7/32; B65D 7/30; A23P 30/10
USPC .... 220/573.1, 912, 756, 755, 759, 767, 772, 220/681, 683, 682, 669, 4.28, 4.31, 4.33; 277/637, 642, 641, 644, 628; 16/425, 16/422, 110.1; 249/117, 127, 139, 160, 249/164, 163, 168, 170, DIG. 1; D7/610, D7/361, 354; 99/439, 428, DIG. 15
See application file for complete search history.

(56) References Cited

U.S. PATENT DOCUMENTS 2,259,854 A * 10/1941 Langel .................... A47J 43/20
249/135

* cited by examiner

*Primary Examiner* — Robert J Hicks
(74) *Attorney, Agent, or Firm* — David R. Heckadon; Gordon Rees Scully Mansukhani LLP

(57) ABSTRACT

A water-tight baking pan assembly having: a bottom plate; a pair of side walls that wrap around the edge of the bottom plate; an O-ring seal positioned between the edge of the bottom plate and the pair of side walls; a pair of vertical seals positioned between opposite ends of the pair of side walls; and a pair of handles, each handle securing one of the vertical seals to the opposite ends of the pair of side walls disposed on either side of the vertical seal, the baking pan assembly permitting baked goods to be partially submerged in water when baking to achieve desired heat distribution.

11 Claims, 5 Drawing Sheets

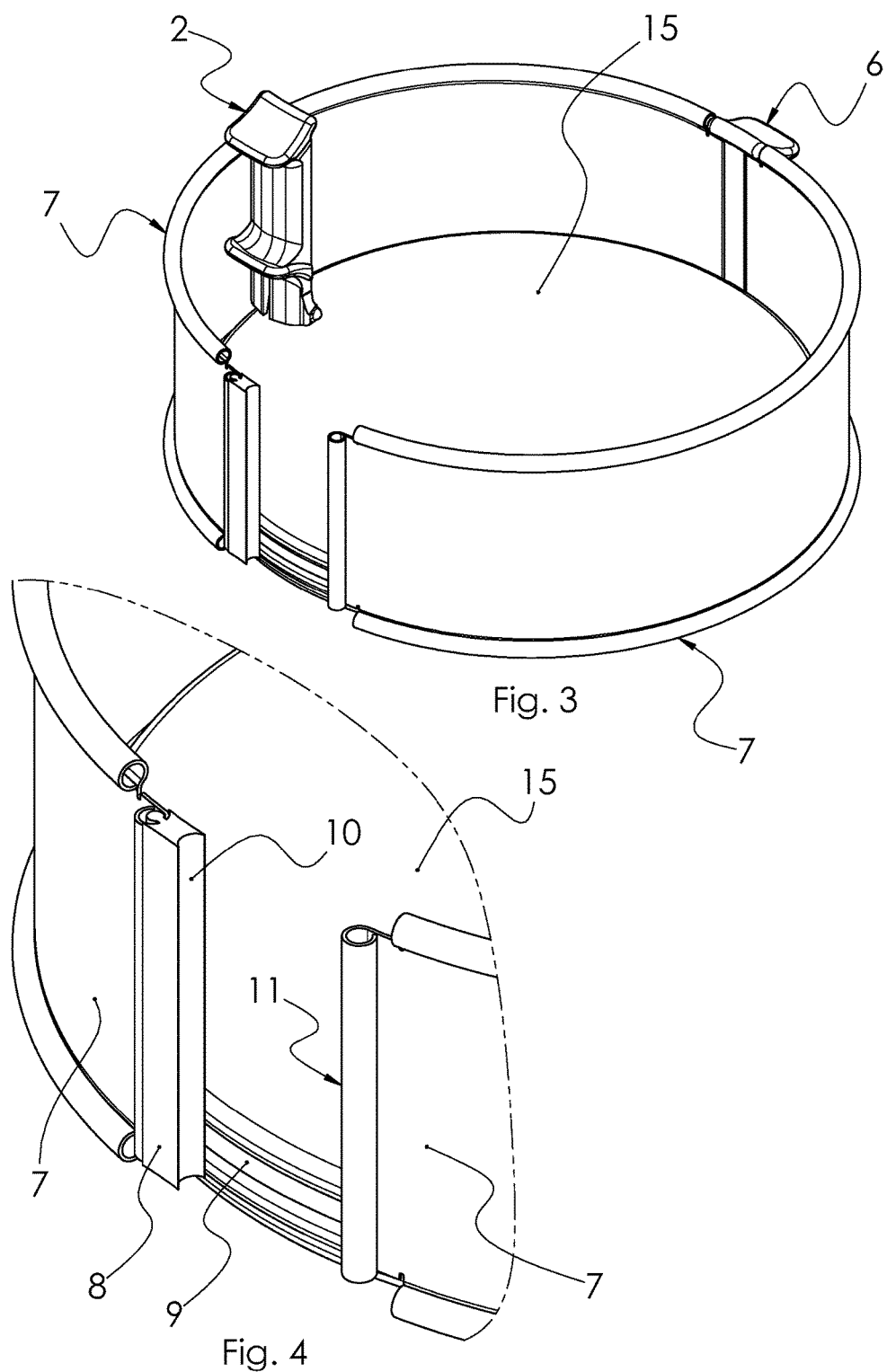

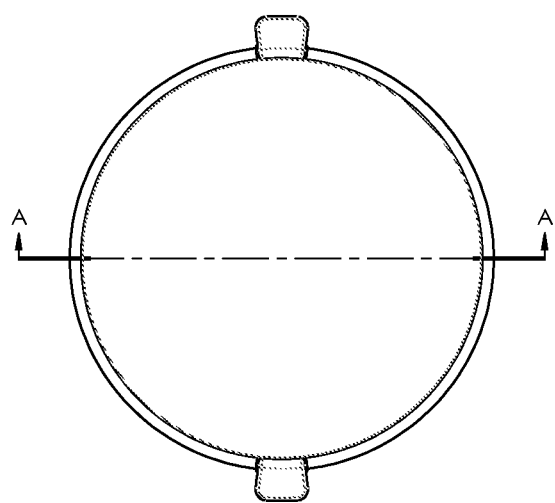
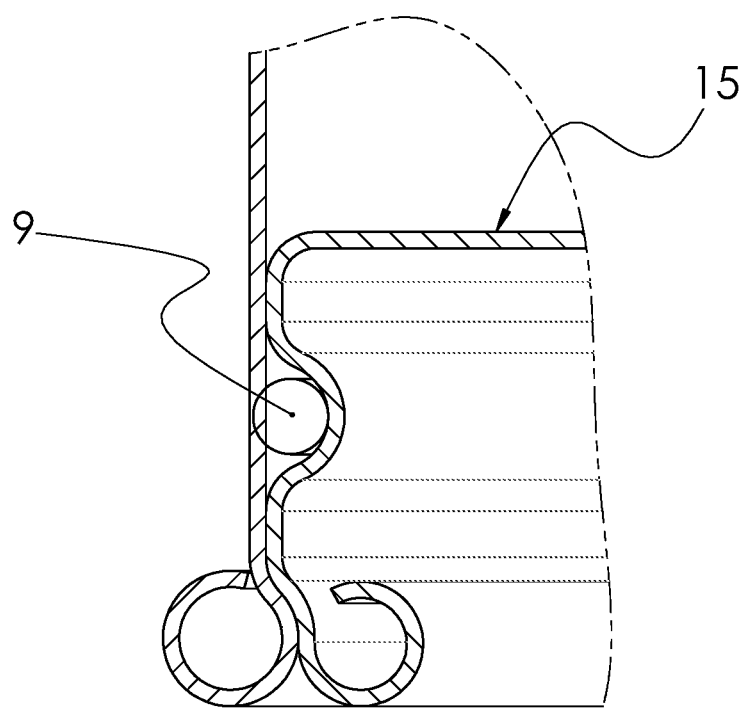
SECTION A-A
SCALE 3 : 1
Fig. 6

WATER-TIGHT SPRINGFORM BAKING PAN

TECHNICAL FIELD

The present invention relates to baking pans.

BACKGROUND OF THE INVENTION

When baking cheesecakes, custards or flans it is desirable to bake in a water bath to achieve optimal even heating of the batter and increased humidity. Unfortunately, water leakage into the pan is a common problem violating the integrity of the batter.

A first solution to this problem requires the baker to place the springform pan into a second pan which both are placed into a third, the water bath. Unfortunately, the disadvantage of this approach leads to the batter heating unevenly due to the air gap between the springform pan and the second pan thereby leading to a lower quality final product. A second solution to this problem is to thoroughly wrap the springform pan in aluminum foil. Unfortunately, aluminum foil cannot create a water tight seal falling short of the consumers' expectations. Furthermore this approach is cumbersome and inefficient.

What is instead desired is a baking pan that permits the batter of various baked goods to be baked while the pan is submerged within a water bath, while still providing a water tight seal. Most preferably, this would be done without the need of aluminum foil or the use of a three-pan baking system. As will be shown, this new baking system provides such a solution.

SUMMARY OF THE INVENTION

The present system provides a leak-proof baking pan assembly in which cheesecakes, custards, flans and other baked goods can be baked while standing in a water bath. Having a water-tight seal, it advantageously provides desired even heating of the batter and crust since it allows for the water of the water bath to come in direct contact with the side walls of the baking pan. This feature of the present system provides much more evenly-distributed heat, thus optimally controlling the temperature of the batter.

In preferred aspects, the present system provides a water-tight baking pan assembly, comprising: (a) a bottom plate; (b) a pair of side walls that wrap around the edge of the bottom plate; (c) an O-ring seal positioned between the edge of the bottom plate and the pair of side walls; (d) a pair of vertical seals positioned between opposite ends of the pair of side walls; and (e) a pair of handles, each handle securing one of the vertical seals to the opposite ends of the pair of side walls disposed on either side of the vertical seal.

Optionally, the O-ring seal is received into a groove that wraps around the edge of the bottom plate. Each vertical seal may preferably have a curved side that mates with a curved end of one of the ends of the side wall. The opposite side of the vertical side wall may optionally have tangs that are received into slots in the opposite side wall.

Preferably, each handle is received downwardly around the opposite ends of the pair of side walls, and may have a finger-receiving lip thereon to make for easy release and opening of the side walls of the baking pan.

BRIEF DESCRIPTION OF THE DRAWINGS

FIG. 3 is an isometric view of the present pan system in its open state.

FIG. 4 is a close up view of the vertical seal and its facets from FIG. 3.

FIG. 6 is a close up sectional view taken along line A-A showing a portion of the side walls of the present pan system.

DETAILED DESCRIPTION OF THE DRAWINGS

The present system provides a water-tight baking pan assembly that permits baked goods to be partially submerged in water when baking to achieve desired heat distribution.

Figure 1:
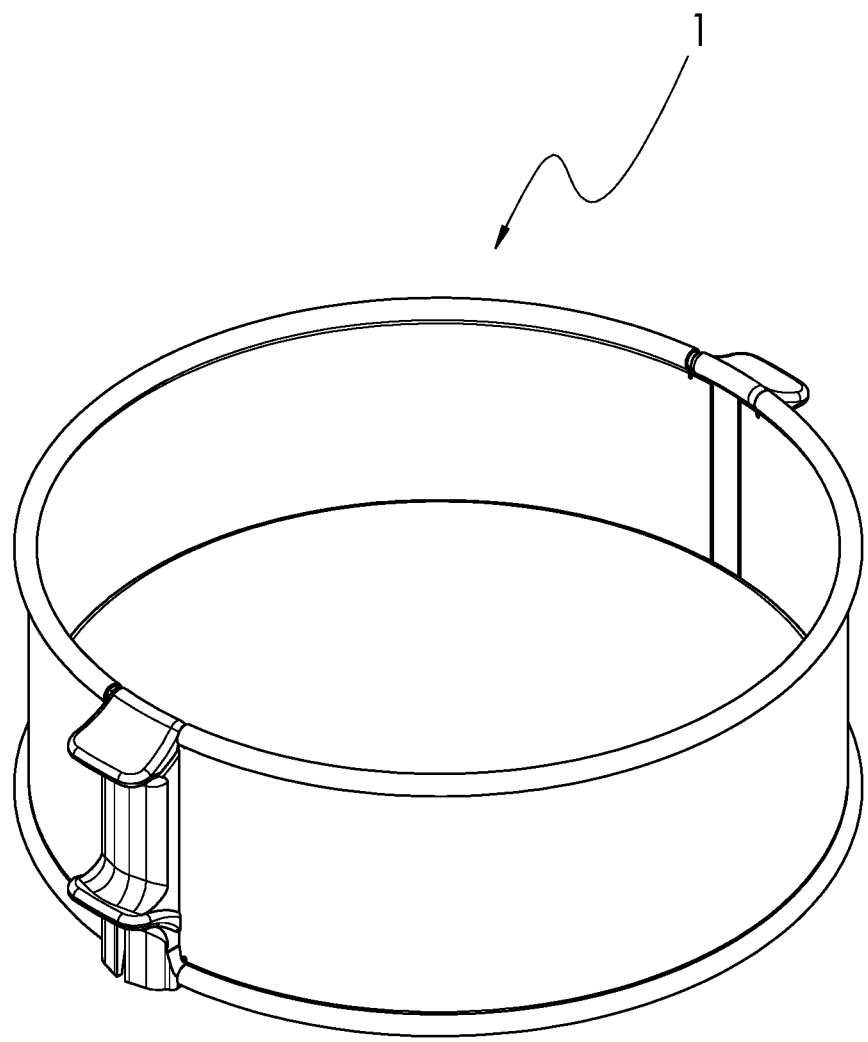
FIG. 1 is an isometric view of the present pan system in its closed state.

As seen in the attached Figures, the present system provides a water-tight baking pan assembly 1, comprising: a bottom plate 15; a pair of side walls 7 that wrap around the edge of bottom plate 15; an O-ring seal 9 that is positioned between an edge of bottom plate 15 and the side walls 7; a pair of vertical seals 8 positioned between opposite ends of the pair of side walls 7; and a pair of handles 2 and 6, with each handle 2 and 6 securing one of the vertical seals 8 to the opposite ends of the pair of side walls 7 disposed on either side of the vertical seal 8. FIG. 1 shows the present system in its assembled "ready-to-bake" (i.e.: prior to the batter being added) or "recently completed baking" (i.e.: when the final baked good is about to be removed) position.

Figure 2:
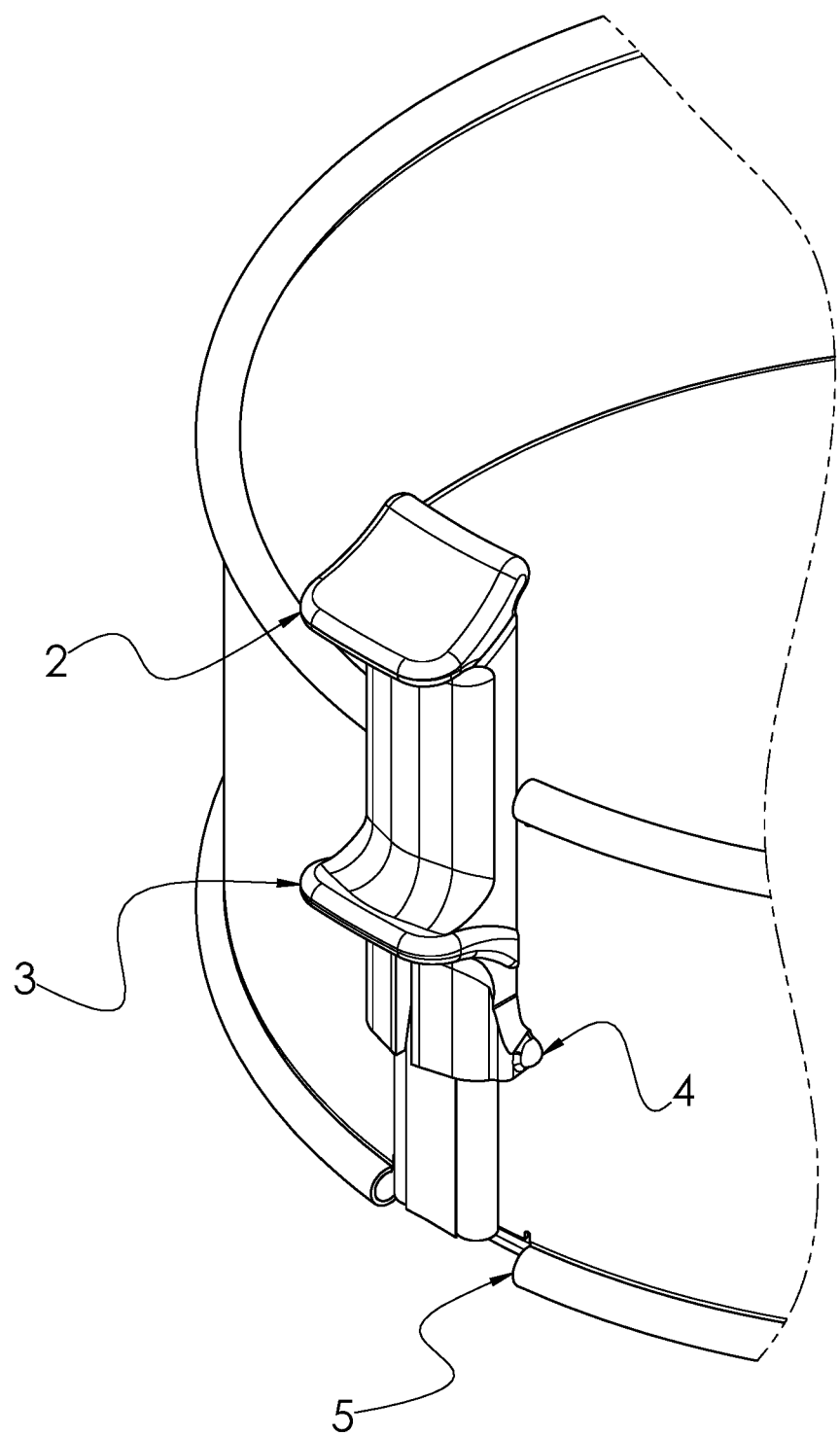
FIG. 2 is a close up view of the handle and its facets from FIG. 1.

FIG. 2 illustrates further details of handle 2. Specifically, handle 2 may have at least one finger-receiving lip 3 and opposite bottom catches 4 (i.e.: one on either side) thereon. When the baker lifts finger-receiving lip 3 to the position shown, the opposite bottom catches 4 will be released from bottom channels 5 in the side walls 7. After baking has been completed, the baker can thus remove the baked good by lifting and thereby releasing the first handle 2 while leaving the opposite handle 6 in place. Once handle 2 has been removed (as seen in FIG. 3), the side walls 7 will "spring apart" even though handle 6 remains in place (due to the ability of side walls 7 to flex somewhat adjacent to handle 6). Moreover, handles 2 and 6 clip into place (with opposite bottom catches 4 received into bottom channels 5) such that the handles ensure the ability to lift the pan out of the water when baking has been completed. After baking is finished, then handles 2 and 6 can be removed as described above. As such, the baking assembly comes completely apart for easy of cleaning and storage.

Preferably, handles 2 and 6 are made of nylon, and bottom 15 and side walls 7 are made of aluminum. However, it is to be understood that the present system is not limited to any particular materials, and that other suitable materials may be substituted, all keeping within the scope of the present invention.

As can also be seen in FIGS. 4 and 6, O-ring seal 9 is received into a groove that wraps around the edge of bottom plate 15. Optionally, O-ring seal 9 can be made of silicone, or any other suitable material.

Figure 5:
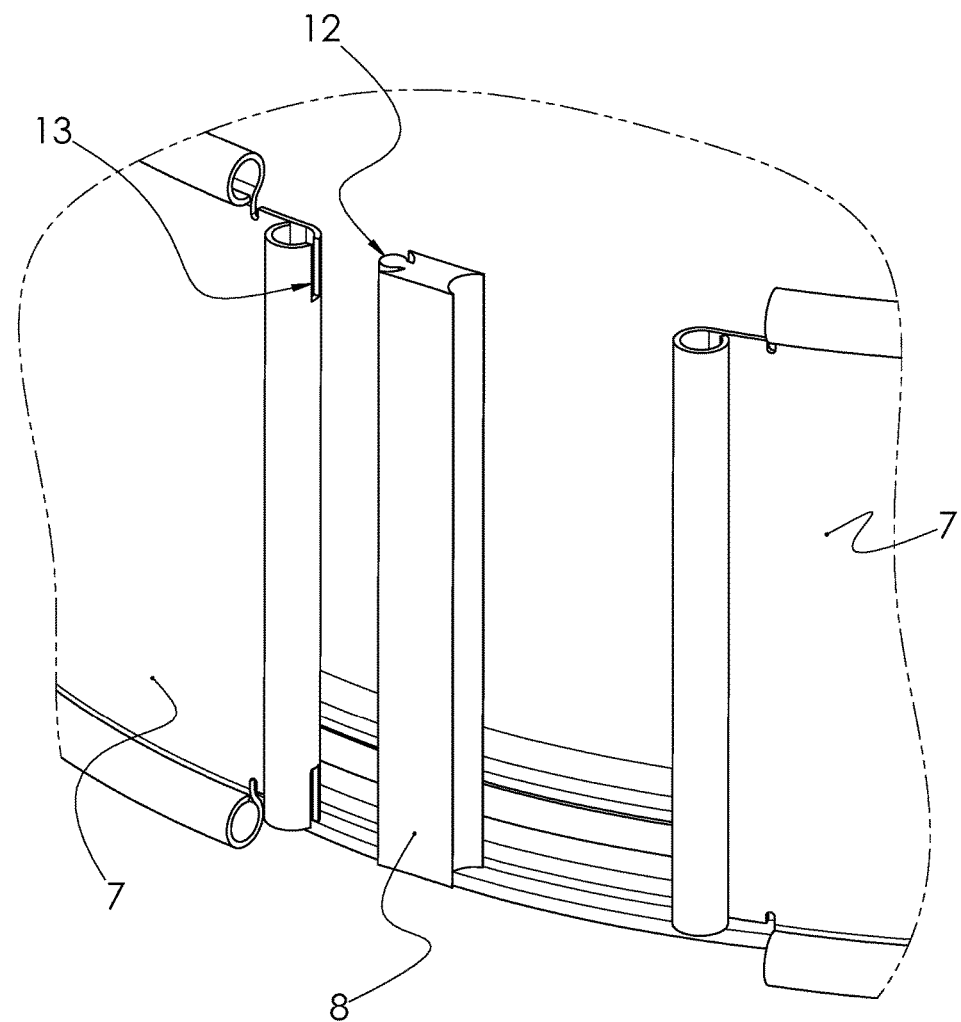
FIG. 5 is an alternate view similar to FIG. 4.

FIGS. 4 and 5 show further optional details of vertical seals 8 and their operation. Specifically, each vertical seal 8 preferably has a curved side 10 that mates with one of the curved ends 11 of the side wall 7. The opposite side of vertical seal 8 optionally has top and bottom tangs 12 that are received into slots 13 in the opposite side wall 7.

As best seen in FIG. 2, handle 2 is received downwardly around the opposite ends of the pair of side walls 7, and as best seen in FIG. 4, the opposite ends of the pair of side walls 7 are curved such that handle 2 is received around the curved opposite ends of the pair of side walls 7 (i.e.: handle 2 and 6 are each slid downwardly to wrap around the curved opposite ends of the pair of side walls 7). As such, handles 2 and 6 are received around vertical seals 8 as well.

What is claimed is:

1. A water-tight baking pan assembly, comprising:
  a bottom plate;
  a pair of side walls that wrap around an edge of the bottom plate;
  an O-ring seal positioned between the edge of the bottom plate and the pair of side walls;
  a pair of vertical seals positioned between opposite ends of the pair of side walls; and
  a pair of handles, each handle securing one of the vertical seals to the opposite ends of the pair of side walls disposed on either side of the vertical seal.

2. The assembly of claim 1, wherein the O-ring seal is received into a groove that wraps around the edge of the bottom plate.

3. The assembly of claim 1, wherein each vertical seal has a curved side that mates with one of the ends of the side wall.

4. The assembly of claim 1, wherein each vertical seal has tangs that are received into slots in an end of one of the side walls.

5. The assembly of claim 1, wherein each handle is received downwardly around the opposite ends of the pair of side walls.

6. The assembly of claim 5, wherein the opposite ends of the pair of side walls are curved and each handle is received around the curved opposite ends of the pair of side walls.

7. The assembly of claim 6, wherein each handle is received around the vertical seal positioned between the curved opposite ends of the pair of side walls.

8. The assembly of claim 1, wherein each handle has at least one finger-receiving lip thereon.

9. The assembly of claim 1, wherein each handle has opposite bottom catches thereon, and wherein each bottom catch is received into a bottom channel in one of the side walls.

10. The assembly of claim 1, wherein the handles are made of nylon.

11. The assembly of claim 1, wherein the bottom plate is circular, square or rectangular.

* * * * *